July 8, 1924.
L. B. HUNTER
PACKAGING MACHINE FOR PLASTIC MATERIALS
Filed Feb. 6, 1922  8 Sheets-Sheet 8
1,500,494
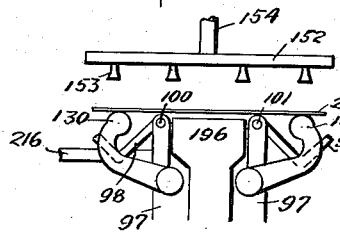
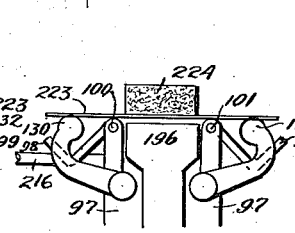
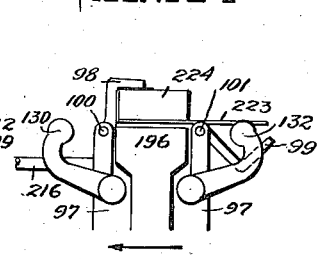
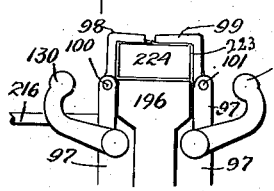
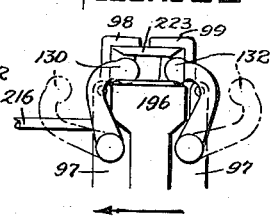
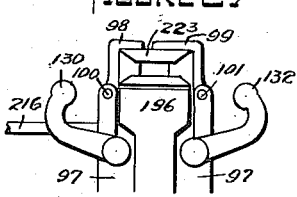
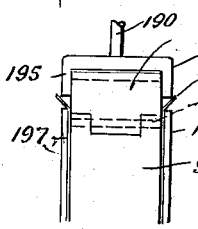
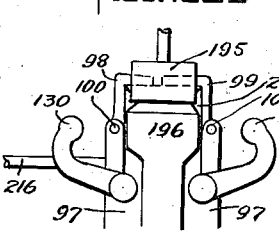
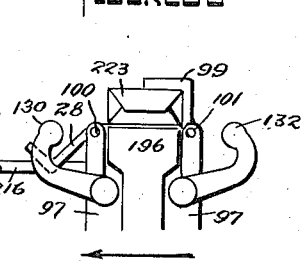
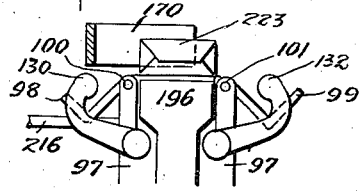
INVENTOR
Lewis B. Hunter
BY
Walton Harrison
ATTORNEY Patented July 8, 1924.

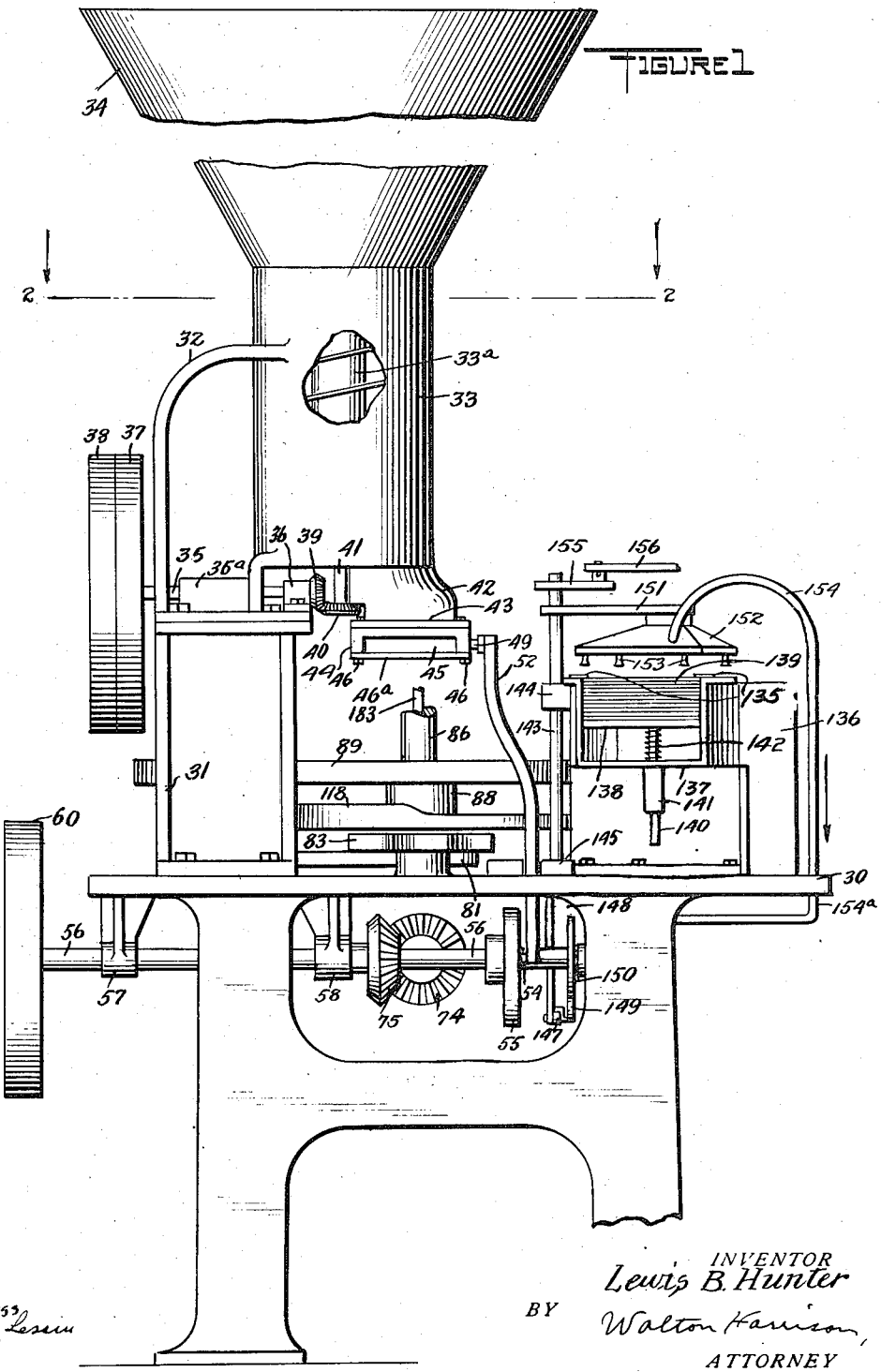

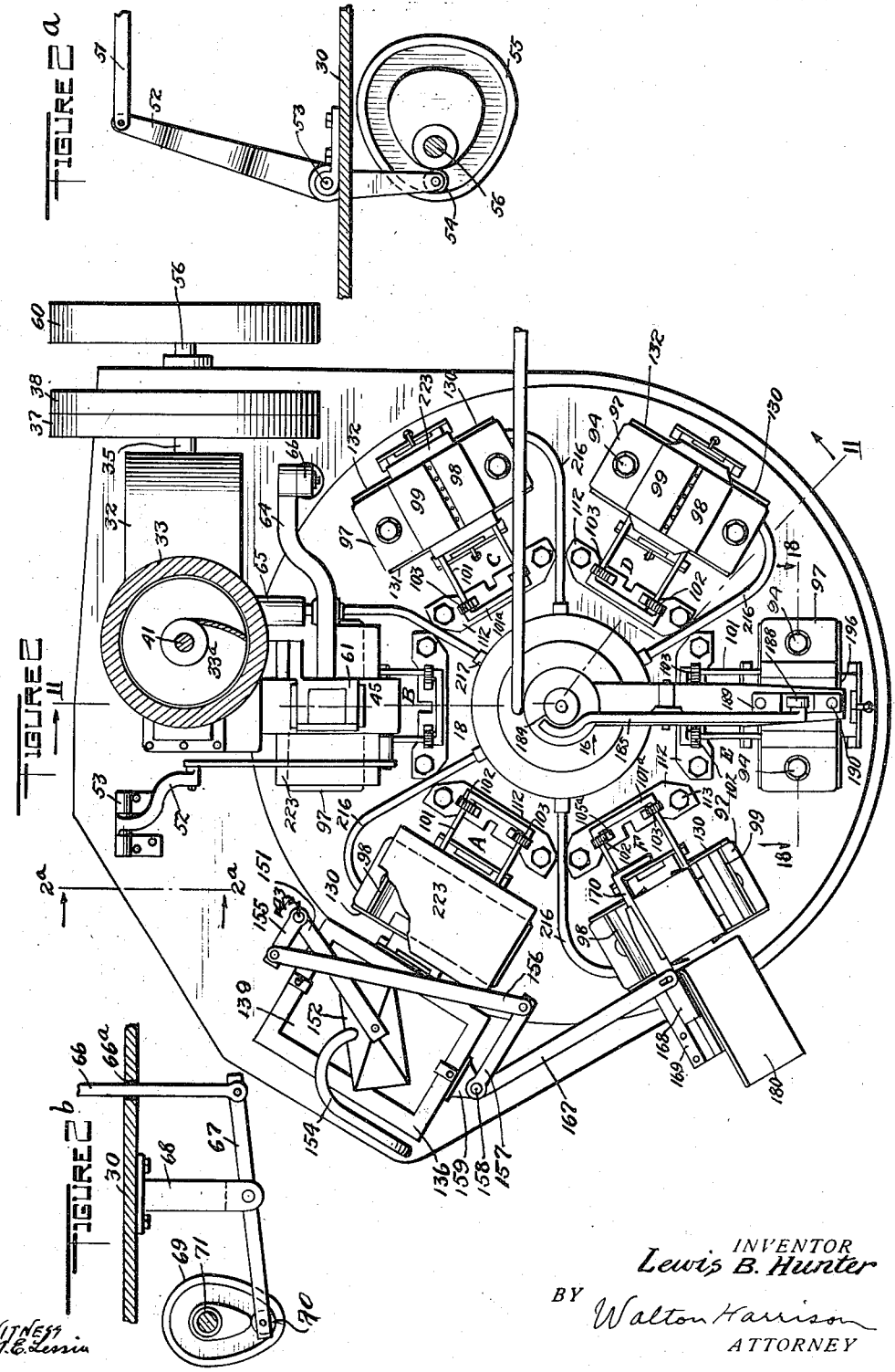

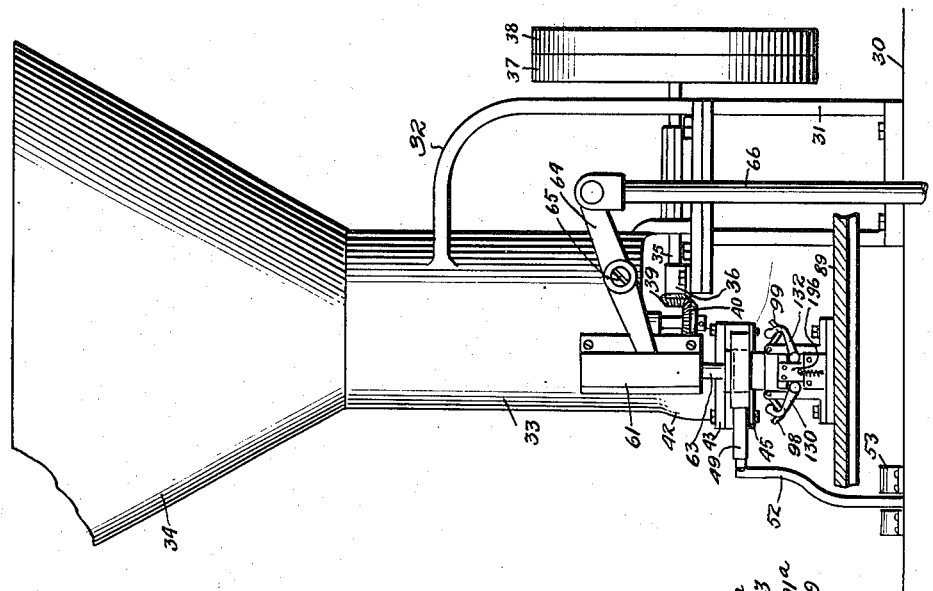
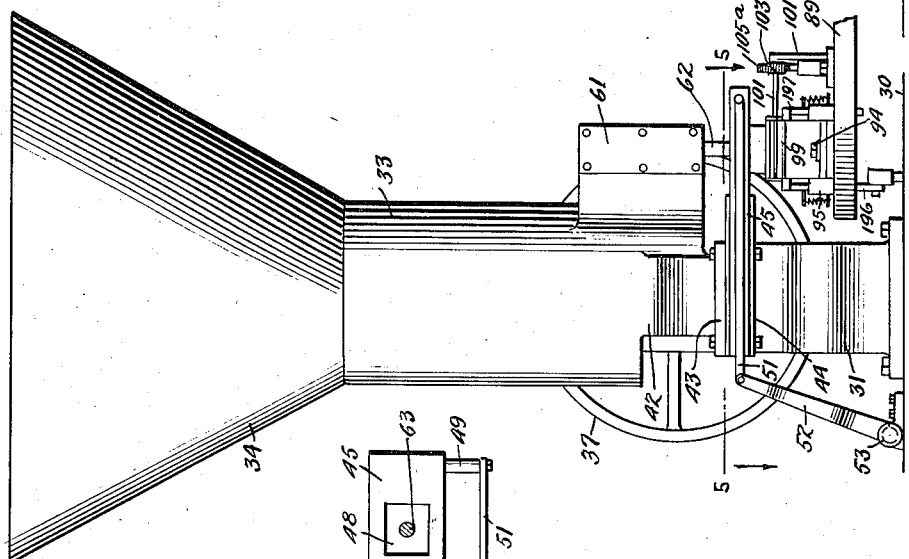

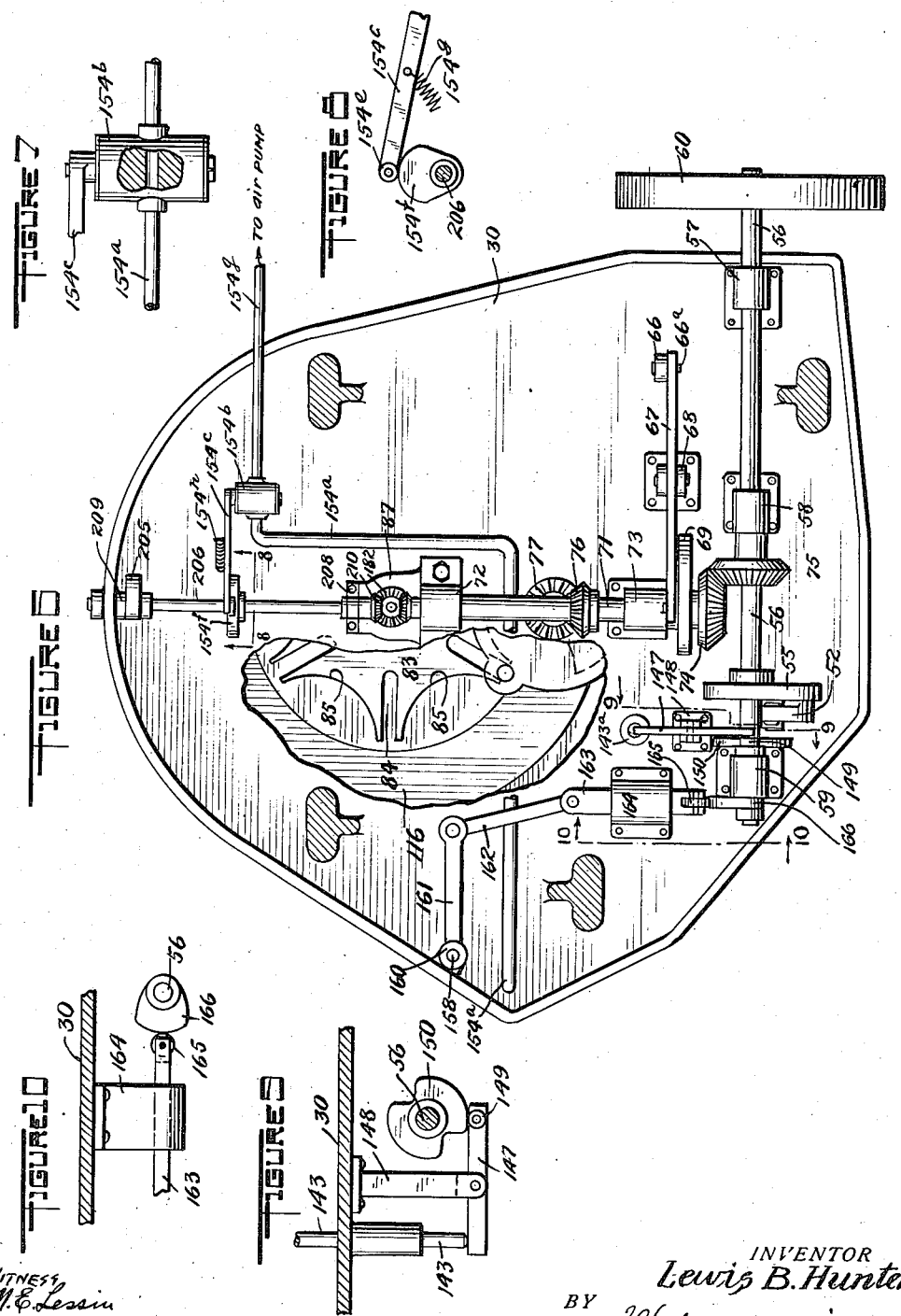

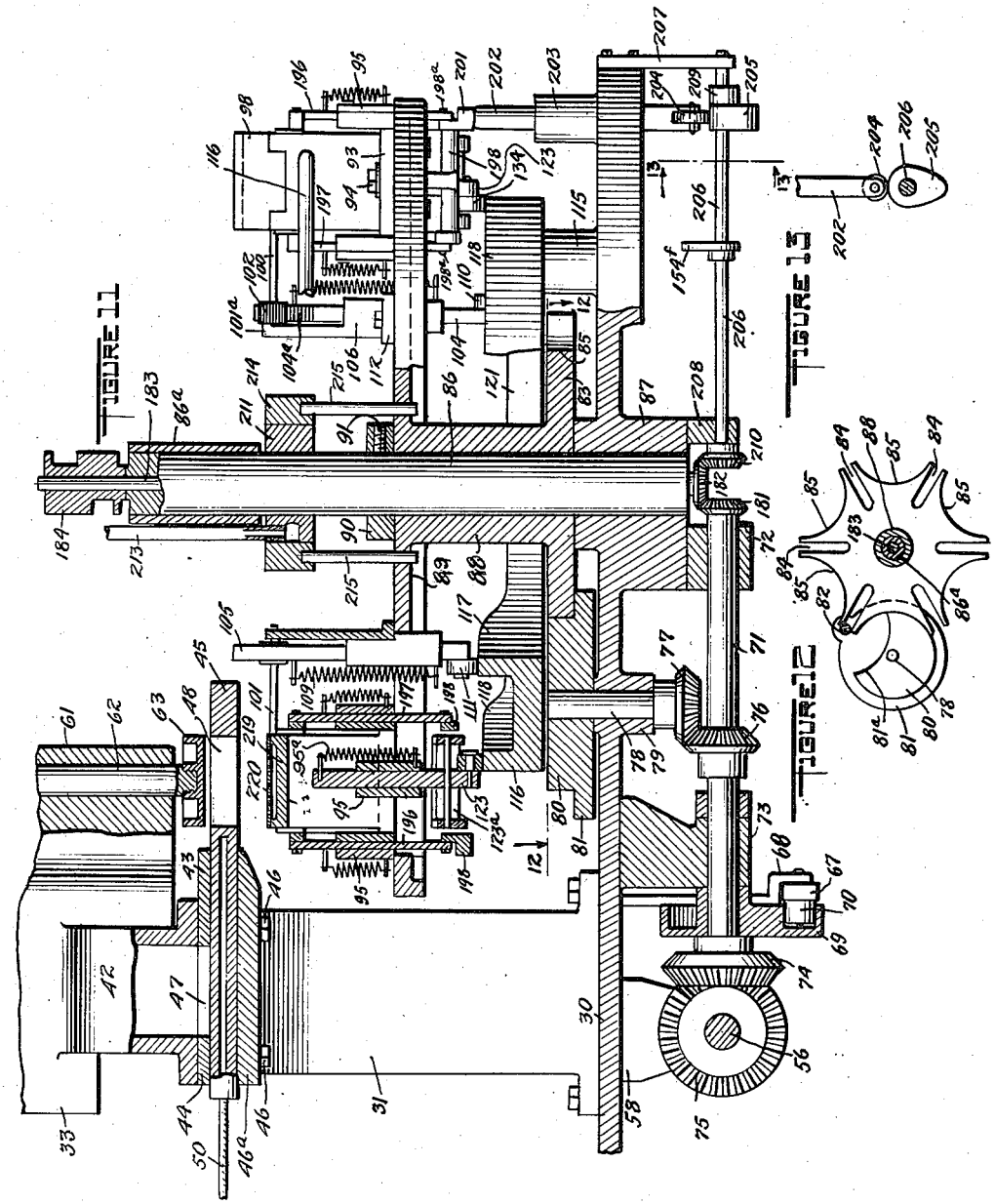

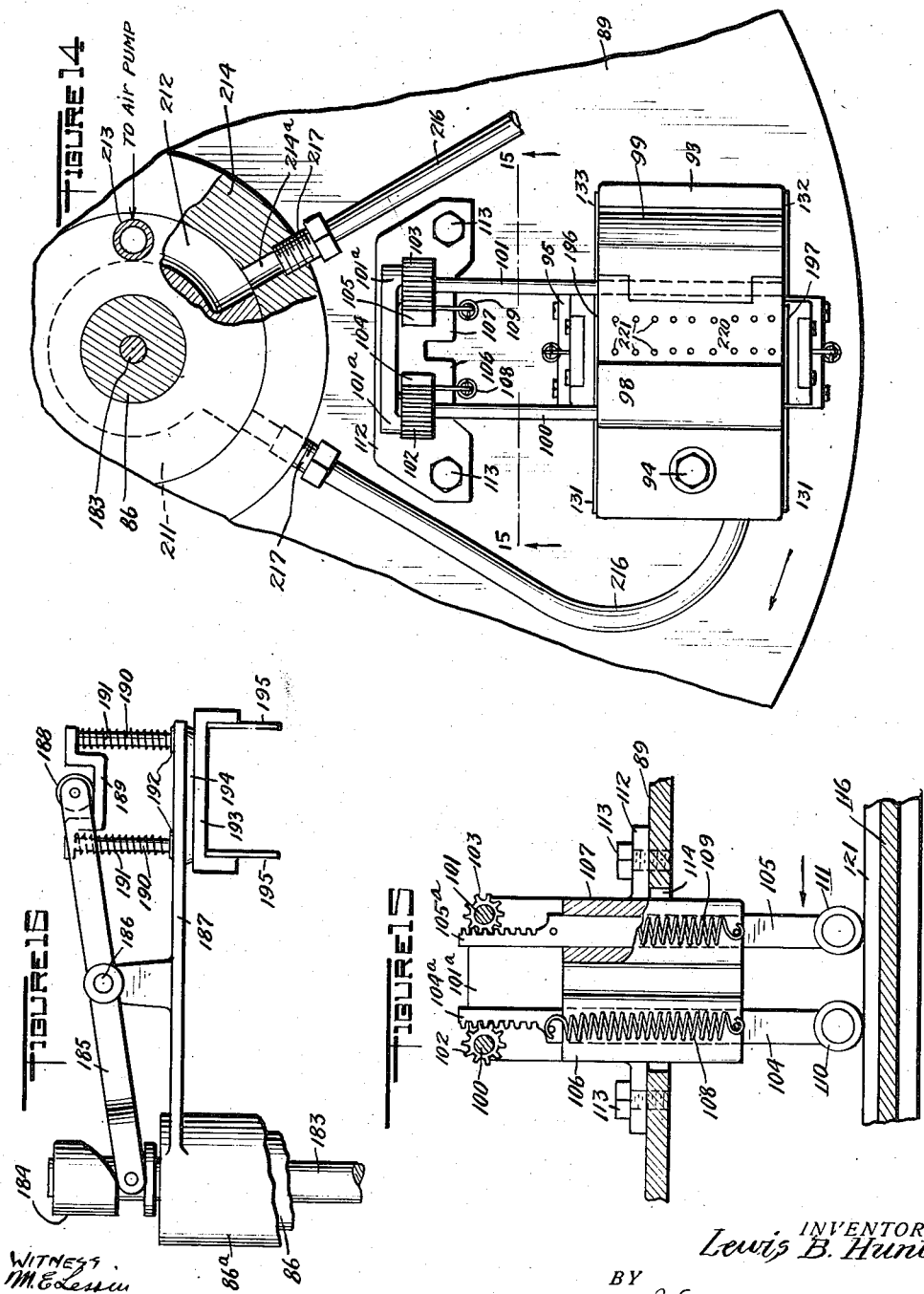

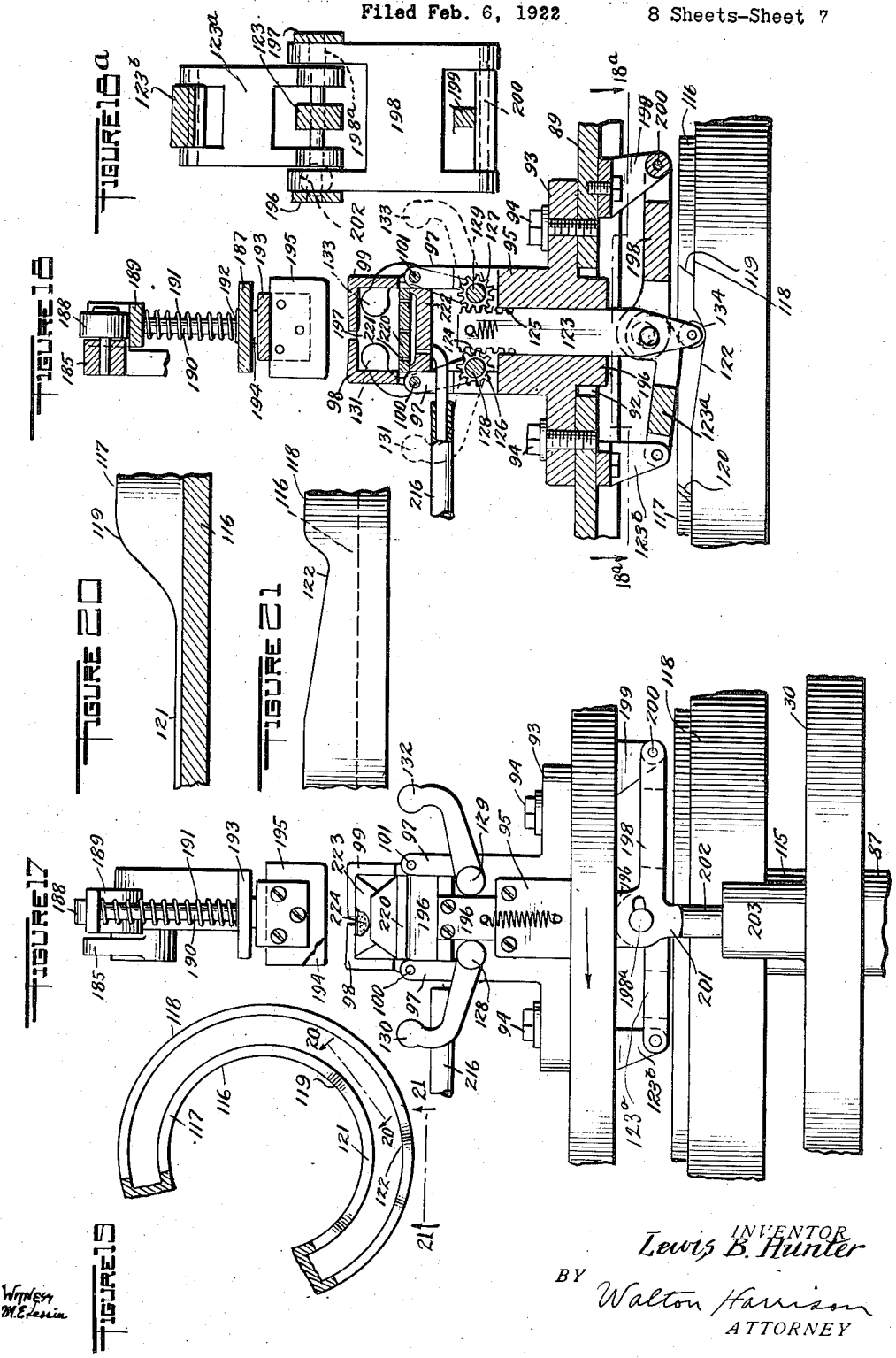

1,500,494

UNITED STATES PATENT OFFICE.

LEWIS B. HUNTER, OF YONKERS, NEW YORK, ASSIGNOR TO PHENIX CHEESE COMPANY, A CORPORATION OF NEW YORK.

PACKAGING MACHINE FOR PLASTIC MATERIALS.

Application filed February 6, 1922. Serial No. 534,634.

*To all whom it may concern:*

Be it known that I, LEWIS B. HUNTER, a citizen of the United States, a resident of Yonkers, in the county of Westchester and State of New York, have invented certain new and useful Improvements in Packaging Machines for Plastic Materials, of which the following is a full, clear, and concise description.

My invention relates to packaging machines for plastic materials such as cream cheeses, butter, lard, and the like.

My invention comprehends a number of improvements for the purpose of increasing the efficiency of the machine, by enabling it to do, as nearly as possible, at a single operation, or a number of such operations taking place under a single mechanical control, all of the work done upon the plastic material and the wrappers used therefor, so as to complete each package of material in good form for the market.

I seek to save time and labor in the handling of the plastic material and the wrappers used therefor, as well as in grouping together the finished packages.

By my invention I also seek to package the material in a manner strictly sanitary, at least to the extent of preventing all necessity for manipulating the material by hand during the time it is being made up in packages.

My invention further contemplates a number of specific improvements in the general mechanism of the packaging machine and also in particular parts thereof, for enabling a relatively large amount of work to be done in a small space.

Further, my invention comprehends a certain amount of security of the wrappers relatively to the cakes of plastic material therein contained, and also contemplates improving the neatness and general appearance of the finished product.

Reference is made to the accompanying drawings forming a part of this specification, and in which like reference characters indicate like parts throughout the several figures.

Figure 1 is a fragmentary side elevation of the packaging machine as a whole.

Figure 2 is a section on the line 2—2 of Figure 1, looking in the direction indicated by the arrows.

Figure 2$^a$ is a section on the line 2$^a$—2$^a$ of Figure 2, looking in the direction indicated by the arrows.

Figure 2$^b$ is a fragmentary section through the fixed table showing the location of certain parts supported thereby.

Figure 3 is a fragmentary end elevation, showing certain parts of the machine as they would appear to an observer standing at the right of Figure 1, and looking toward the mechanism shown in said last mentioned figure.

Figure 4 is a fragmentary side elevation of the machine, showing the reverse side thereof as contrasted with Figure 1.

Figure 5 is a fragmentary section on the line 5—5 of Figure 3, looking in the direction indicated by the arrows.

Figure 6 is an inverted plan, or bottom view of the stationary table forming a part of the machine, certain parts being broken away.

Figure 7 is a detail view of a valve shown in Figure 6, and used in connection with the pneumatic mechanism forming a part of my device.

Figure 8 is a fragmentary section on the line 8—8 of Figure 6, looking in the direction indicated by the arrows.

Figure 9 is a fragmentary section on the line 9—9 of Figure 6, looking in the direction indicated by the arrows.

Figure 10 is a fragmentary section on the line 10—10 of Figure 6, looking in the direction indicated by the arrows.

Figure 11 is a section on the line 11—11 of Figure 2, looking in the direction indicated by the arrows.

Figure 12 is a fragmentary section on the line 12—12 of Figure 11, looking in the direction indicated by the arrows.

Figure 13 is a section on the line 13—13 of Figure 11, looking in the direction indicated by the arrows.

Figure 14 is a view partly in plan and partly in section, showing certain details appearing in Figure 2.

Figure 15 is a section, approximately upon the line 15—15 of Figure 14, looking in the direction indicated by the arrows.

Figure 16 is a fragmentary elevation of the two upper blades, used in folding of the wrapper around the cake of cheese, and means for supporting these blades.

Figure 17 is a fragmentary view of one of the platforms carried by the turntable, and used for applying the wrapper to the cake of cheese.

Figure 18 is a fragmentary section on the line 18—18 of Figure 2, looking in the direction indicated by the arrows, and showing a portion of the mechanism for forming the packages.

Figure 18ª is a section on the line 18ª—18ª of Figure 18, looking in the direction indicated by the arrows.

Figure 19 is a fragmentary plan of a portion of the cam base and its cams for actuating the mechanism shown in Figure 18.

Figure 20 is a section on the line 20—20 of Figure 19, looking in the direction indicated by the arrows.

Figure 21 is a section on the line 21—21 of Figure 19, looking in the direction indicated by the arrows.

Figures 22 to 31 inclusive are diagrams, indicating one of the package wrapping platforms and various movable parts immediately associated therewith, as used for placing a wrapper upon a cake of cheese or the like, the several figures indicating the various successive positions of the movable parts, at different stages of the work of folding the wrapper upon the cake.

*Feed mechanism.*

A table 30, made of metal, supports most of the working parts. Mounted upon the table, and extending upwardly therefrom, is a frame beam 31. Mounted upon this frame beam is a frame member 32, and cast integral with this frame member is a metallic cylinder 33, hereinafter designated as a cheese cylinder. Extending above the cheese cylinder and supported thereby is a flaring member 34. This flaring member and the cylinder 33 together constitute a feed hopper, used for the purpose of supporting plastic material and continuously forcing it downwardly to be made up into packages. In the particular instance herein contemplated the plastic material is cream cheese, which is a rather soft cheese, of about the consistency of butter, or possibly a little softer. My device may be used, however, for packaging plastic materials other than cream cheese.

A revoluble shaft 35 is journaled upon the frame member 32, and is supported by bearings 36, 36ª. Mounted upon the shaft 35 are a pair of pulleys 37, 38, these being preferably fast and loose pulleys and of the conventional or any preferred form. The shaft 35 carries a bevel gear 39, which meshes with a bevel gear 40, the latter being carried by a revoluble shaft 41. This shaft extends up centrally within the cylinder 33, and is a part of the feed mechanism indicated as 33ª. By rotation of the shaft 41, the feed mechanism 33ª is actuated in such manner as to stir the cheese mass continuously and constantly force it downwardly.

The cheese cylinder 33 is provided with an outlet pipe 42 of the form shown. Secured rigidly at the bottom of the outlet pipe, and so located as to partially close the same, is a bottom plate 43.

*Cake forming mechanism.*

Mounted upon this bottom plate 43, and extending below the latter is a slideway frame 44, the form of which may be understood by reference to Figures 1, 5 and 11.

Mounted within the slideway frame 44 and supported thereby is a slide 45, of the form shown more particularly in Figures 2 and 11. Engaging the under side of the slideway frame 44 is a bottom plate 46ª, detachably held in position by bolts 46. The bottom plate 43 is shown fragmentarily in Figure 5, and is provided with an opening 47 of rectangular form and conforming in size to the cross section of a cake of cheese such as is to be formed and packaged by the machine. The slide 45 is provided with an elongated opening 48, of suitable size to mold a cake of cheese and to register exactly with the opening 47 in the bottom plate 43, whenever the slide 45 is in proper position for this purpose. This may be understood from inspection of Figure 5.

The slide 45 is movable back and forth in the direction of its length. It is shown in Figure 5 as occupying a position at one of the limits of its travel, its position at the other limit of its travel being such as to bring the opening 48 of the slide into exact registry with the opening 47 of the bottom plate 43, as shown more particularly in Figure 1.

In order to actuate the slide 45 I provide a pin 49 extending laterally from it. An insulated conductor 50 is used for heating the slide electrically. Connected with the pin 49 is a pitman 51, the latter being also connected with the upper end of a lever 52. This lever is mounted upon a bearing 53 and has a form shown more particularly in Figure 2ª. The lever 52 carries at its lower end a roller 54, extending in a direction lateral to the length of the lever and engaging a cam 55, this cam being mounted rigidly upon a revoluble shaft 56. The form and location of this shaft may be understood by reference to Figure 1. It is mounted upon bearings 57, 58 and 59, as indicated in Figure 6, and extends horizontally. It is located a short distance below the table 30, as shown more particularly in Figure 1.

The shaft 56 carries a pulley 60 fixed upon it, and by means of which it is driven from any suitable source of power.

*Cake displacing mechanism.*

Mounted upon the cylinder 33 and disposed adjacent the lower end thereof is a slideway 61, and fitted into this slideway is a sliding rod 62, movable vertically in the direction of its length. This sliding rod carries a plunger 63, having a general rectangular form and of such size as to fit neatly but loosely into the opening 48 in the slide 45, as may be understood from Figure 11. Connected with the sliding rod 62 is a lever 64, mounted to rock upon a pin 65 as shown more particularly in Figure 4. Connected with the lever 64 for the purpose of actuating the same is a rod 66 which passes downwardly through a hole 66ª in the table 30, and below this table is connected with one end of a rocking lever 67. The rocking lever is mounted upon a bearing 68, depending from the lower face of the table 30.

Disposed adjacent the lever 67, and located immediately below the table 30, is a cam 69. Engaging this cam is a roller 70, shown more particularly at the bottom of Figure 11, and carried by the lever 67.

The cam 69 is mounted rigidly upon a revoluble shaft 71, this shaft being mounted in bearings 72, 73 which extend downwardly from the lower face of the table 30.

The shaft 71 carries a bevel gear 74, and this bevel gear meshes with another bevel gear 75, which is secured upon the revoluble shaft 56 above described.

It will be observed that when the shaft 56 is turned by means of the pulley 60, motion is transmitted through the bevel gears 75, 74, to the shaft 71. This causes rotation of the cam 69, so that the lever 67 is rocked and the rod 66 is thereby actuated. Thus the lever 64 is rocked, and the plunger 63 is caused to reciprocate.

The parts are so proportioned and arranged that the plunger 63 makes a thrust downwardly, and returns to its normal position indicated in Figure 11, each time the slide 45 reaches the position indicated for it in this figure.

The slide 45 moves back and forth in the direction of its length, as above described. Each time it reaches such position that the opening 48 is brought into registry with the opening 47, a quantity of cheese sufficient to fill the opening 48 passes into this opening, so as to fill it completely. Then as the slide moves into the position indicated for it in Figures 5 and 11, it practically executes a shearing movement so as to sever the measure of cheese now contained within the opening 48. This same movement of the slide, by shifting the position of the opening 48 as above described, carries the measure of cheese out directly under and into exact registry with the plunger 63. The result is that the descent of the plunger, as above described, has the effect of displacing the measure of cheese, now formed into a cake. This cheese cake goes through other operations, hereinafter described in detail.

*Turntable and its accessories.*

Mounted rigidly upon the shaft 71 and revoluble therewith is a bevel gear 76, which meshes with a bevel gear 77. This last mentioned bevel gear is mounted rigidly upon the lower end of a rather short vertical shaft 78, shown more particularly in Figure 11. The vertical shaft 78 extends through a bearing 79, and carries an actuating wheel 80, secured rigidly upon the upper end of the shaft as indicated in Figure 11. The form of the actuating wheel 80 and of parts immediately associated therewith may be understood from Figure 12. The actuating wheel 80 is provided with a flange 81 and with a scallop face 81ª, and carries a driving pin 82 disposed adjacent this scallop face.

Associated with the actuating wheel 80 is a Geneva wheel 83, of the form shown more particularly in Figure 12. The Geneva wheel is provided with a number of slots 84, disposed radially, and also with a number of scallop faces 85.

The Geneva wheel 83 and the actuating wheel 80 are so proportioned and arranged, and adapted each to the other, that when the actuating wheel 80 is driven continuously and at a substantially constant speed, the Geneva wheel 83 is turned intermittently, step-by-step, and is also intermittently locked firmly in definite successive positions.

The actuating wheel 80 and the Geneva wheel 83 thus constitute together a form of Geneva stop.

It will be noted that each time the actuating wheel 80 makes a complete revolution, it first enters the outer or open end of a slot 84, and advances along this slot toward the center of rotation of the Geneva wheel 83; and after reaching the limit of its travel relatively to the slot it begins to recede, and then leaves the slot by passing out of the open or outer end thereof. Because of this arrangement the Geneva wheel 83, in making each of its step-by-step rotational movements, first travels slowly, then more rapidly and then again slowly. That is to say, its motion starts from zero, from which it is gradually speeded up to a maximum and then speeded down to zero. Because of the action just described, the work done by the Geneva stop is greatly improved. The motion of the Geneva wheel is not at all jerky, although each of its movements is executed with great rapidity. The gradient of its movement is so arranged as to attain a maximum of rapidity, coupled with a minimum of strain. For this reason the working of the Geneva stop is practically noiseless, and is not accompanied by any perceptible shock to other mechanical parts. Moreover, the stop wheel 80 and the Geneva wheel 83 may be rendered relatively small as compared with other movable mechanical parts to be driven by, or to be used for driving, the Geneva stop.

A stationary column 86, having generally the form of a massive tube, is supported by the table 30. For this purpose the table 30 is provided with a massive, hub-like portion 87, as indicated more particularly in Figure 11, the lower end of the column 86 being secured rigidly within this hub-like portion. The column 86 serves the purpose of a stationary shaft for supporting certain working parts, as hereinafter more particularly described.

The Geneva wheel 83 is mounted upon the stationary column 86. Integral with the Geneva wheel, and extending upwardly therefrom, is a sleeve 88, supporting a turntable 89, also integral with it, the sleeve 88 thus serving practically as a hub for the turntable. A collar 90 encircles the stationary column 86, and is held rigidly in position thereupon by a set screw 91.

The collar and the hub-like portion 87 of the table 30 serve to prevent the turntable 89 and the Geneva wheel 83 from being displaced by any vertical movement, and thus tend to render true the movement of these parts.

The turntable, because of its connection with the Geneva wheel 83, has when in action a step-by-step movement similar to that above described for the Geneva wheel. The purpose of the turntable is to advance, step-by-step, the various mechanisms used for packaging the cheese, as hereinafter more completely described.

*Package wrapping platform.*

The turntable 89 is provided with a number of holes 92 extending through it and spaced equidistant, one of these holes being shown more particularly in Figure 18. Covering each hole 92 is a base 93, detachably secured upon the turntable by bolts 94 and carrying a hollow frame 95, this frame having a reduced portion 96, extending downwardly and through the hole 92. The frame 95 is further provided with bearings 97, extending above it. Supported by these bearings are a pair of folder arms 98, 99, the folder arm 98 being mounted upon a shaft 100, and the folder arm 99 being similarly mounted upon a shaft 101. The shaft 100, 101 are supported in part by the bearings 97, and in part by a pair of bearings 101ª, as shown in Figure 14. Each folder arm 98, 99 is adapted to rock within definite limits of travel which may be understood from Figures 17, 27, 28. The rocking movements of the two folder arms are performed, however, at slightly different moments; each movement of the folder arm 98, in either of two directions, preceding the corresponding or similar movement of the folder arm 99. That is to say, reckoning from the direction of step-by-step travel of the turntable, as indicated by the arrow in Figure 2, the folder arm 98, which in front, acts to all intents and purposes a little more quickly than the other folder arm 99 of the same pair.

For the purpose of actuating the shafts 100, 101, I provide them with pinions 102, 103, secured rigidly upon them.

Disposed adjacent these pinions and located below the same are a pair of sliding bars 104, 105, provided respectively at their upper ends with portions 104ª, 105ª, formed into racks, as shown in Figure 15, these racks engaging the pinions 102, 103, in such manner that sliding movements of the bars 104, 105 will cause the racks to turn the pinions in opposite directions. The sliding bars 104, 105, are mounted in bearings 106, 107, as shown more particularly in Figure 14. The tensile spring 108 is connected with the sliding bar 104 and with the bearing 106, another tensile spring 109 being similarly connected with the sliding bar 105 and with the bearing 107. The tensile springs 108, 109 are always under tension, and because of this fact have a tendency to force the sliding bars 104, 105 downwardly, each in the direction of its length, as may be understood from Figure 15. The bearings 106, 107, are here shown as made in a single piece mounted upon a base 112, this base also supporting the bearings 101ª, and being detachably secured upon the turntable 89 by means of bolts 113. The sliding bar 104 carries upon its bottom end a roller 110, a similar roller 111 being mounted upon the bottom end of the sliding bar 105. The bearings 106, 107, extend through a hole 114 in the turntable 69, as indicated in Figure 15.

Located below the turntable 89, and supported upon bosses 115 extending upwardly from the table 30, is a cam base 116 having a general annular form and provided with a pair of cam walls 117, 118, as shown more particularly in Figure 11 and 19. The cam wall 117 extends upwardly from the inner edge of the cam base 116 and concentric to the cam wall 118, which extends upwardly from the outer edge of said cam base. The cam wall 117 is partially cut away as indicated in Figure 20, so as to present a pair of inclined portions 119, 120 and a connecting intermediate portion 121, this intermediate portion being quite low as compared with the rest of the cam wall. The cam wall 118 is provided with a single depression 122, as indicated more particularly in Figures 19 and 21.

The cam wall 117 with its depressed portion 121, is engaged by the roller 110, 111, above described as mounted upon the sliding bars 104, 105. That is to say, each roller 110, 111 runs upon the inner cam wall, and is in engagement with the same at all times. For this purpose the cam wall in question may be considered as practically a track, upon which the rollers 110, 111 are arranged to run in tandem, each of these rollers being alternately raised and lowered in consequence of the conformity of the cam wall as above described. Since the cam wall in question is fixed in position and the rollers 110, 111 more relatively to it, the roller 110 being in front, it necessarily follows that whenever the roller 110 moves either upwardly or downwardly, the roller 111 must immediately afterward execute a similar movement. Thus the sliding bars 104, 105 must cause the shafts 100, 101 to execute rocking movements, so arranged that any movement conferred by the shaft 100 upon the folder arm 98 is followed an instant later by a similar movement, conferred upon the folder arm 99 by the shaft 101. These successive movements of the folder arms 98, 99, take place when these arms move either into the position indicated for them in Figure 17, or out of such position. The purpose of thus causing the two folder arms 98, 99 to move in successive order as stated is for the purpose of manipulating the wrapper relatively to the cheese cake, and as hereinafter more completely described.

Extending through the frame 95 is a sliding bar 123, and a tensile spring 95ª connects this sliding bar with the frame work: The sliding bar 123 is provided with two sets of rack teeth 124, 125 formed upon the long edges of the bar and thus disposed oppositely to each other.

These two sets of rack teeth engage respectively two pinions 126, 127, these pinions being secured rigidly upon two shafts 128, 129, extending horizontally and adapted to rock in opposite directions. The shafts 128, 129 are supported by the frame 95. A link 123ª is journaled to the sliding bar 123 and to a bearing 123ᵇ, mounted upon the framework.

Mounted upon the shaft 128 are a pair of folder fingers 130, 131, and similarly mounted upon the shaft 129 are another pair of folder fingers 132, 133.

The pair of folder fingers 130, 131 have, under the control of the shaft 128, two normal positions; and the pair of folder fingers 132, 133 under control of the shaft 129, have likewise two normal positions. The respective normal position of the different fingers may be understood by reference to Figures 17 and 18.

The sliding bar 123 carries a roller 134, which engages and runs upon the cam wall 118—that is, the outer cam wall according to Figure 19.

Whenever the frame 95, carried by the turn-table, passes over the depression 122 in the cam wall 118, as indicated in Figure 18, the sliding bar 123 makes a thrust downwardly which is quite abrupt, and then rises, a little more slowly, to its original position, as may be understood from Figure 18. This means that all of the folder fingers 130, 131, 132, 133, as a gang, quickly assume one position, and then as a gang but a little more slowly assume a different position.

The parts are so arranged and co-related as to act in sequence as follows: First, the folder arm 98 swings upwardly and into the position indicated for it in Figure 24, and a moment later the folder arm 99 likewise moves upwardly, into the position indicated for it in Figure 25; next all four of the folder fingers 130 and 132 swing upward simultaneously, as indicated by dotted lines and full lines in Figure 26; then all four of the folder arms last mentioned swing downward simultaneously, as indicated in Figure 27; next the folder arm 98 alone swings downwardly, as indicated in Figure 30, and the next moment the folder arm 99 also swings downwardly as shown in Figure 31. The various steps just mentioned are repeated. in the successive order just stated, each time the turntable, travels a step in its step-by-step movement above described.

*Wrapper magazine and its accessories.*

A magazine frame 136 is mounted upon the table 30, and extends upwardly therefrom. Supported upon this magazine frame is a shelf 137, and movably mounted—within this shelf is a follower plate 138. A number of wrappers are shown at 139 and rest upon the follower plate 138. Connected with the follower plate 138, and extending downwardly therefrom, is a guide rod 140, slidably fitted into a neck 141 of tubular form, this neck extending downwardly from the shelf 137.

A spiral spring 142 encircles a portion of the guide rod 140, and presses upwardly against the underside of the follower plate 138.

The spring 142 is of sufficient strength to support the entire pile of wrappers 139 in such manner that, as these wrappers are removed one at a time from the top of the pile, the follower plate 138 gradually rises. A number of stops 135 limit the upward travel of the pile of wrappers. The tendency of this arangement is to maintain the upper surface of the pile of wrappers at a constant level. That is to say each individual wrapper, when uncovered by the removal of the wrapper immediately above it, comes up to the top of the pile of wrappers, and thus to the aforesaid common level.

Disposed adjacent the magazine frame 136 is a shaft 143, mounted in bearings 144, 145, this shaft being adapted to make slight movements of two different kinds—that is, a vertical thrusting movement, and a rocking movement.

The shaft 143 extends through the table 30, and at its lower end rests upon a rocking lever 147. The rocking lever 147 is mounted upon a bearing 148, extending downwardly from the under face of the table 30. The rocking lever 147 carries a roller 149, and this roller is engaged by a cam 150, mounted rigidly upon the shaft 56. Thus the rotation of the shaft 56, under control of the pulley 60 causes the cam 150 to actuate the rocking lever 147, and this lever causes the shaft 143 to slide vertically within the bearings 144, 145.

Mounted rigidly upon the shaft 143 is an arm 151, carrying a vacuum plate 152. The vacuum plate is provided with a number of pneumatic mouthpieces 153, extending downwardly from it. The parts are so arranged that the vacuum plate may be brought directly over the pile of wrappers 139.

Connected with the vacuum plate 152 for the purpose of maintaining a partial vacuum therein, is a pipe 154, extending downwardly through a hole in the table and provided with a portion 154$^a$, extending horizontally underneath the table. This portion 154$^a$ is provided with a valve 154$^b$, shown more particularly in Figure 7. The valve has movable arm 154$^c$, whereby it is opened and closed. A spring 154$^g$, extends from this arm to the table 30, and is always under tension. The arm carries a roller 154$^e$, and under tension of the spring 154$^g$ the arm presses the roller against a cam 154$^f$ with which it is associated, and whereby it is so actuated as to rock the arm 154$^c$, and thus the cam opens and closes the valve in sequence with movements of the vacuum plate 152, as used for manipulating the wrappers, and as hereinafter more fully described. From the valve 154$^b$ a portion 154$^h$ of the pipe leads to an air pump, not shown.

Mounted rigidly upon the shaft 143 is an arm 155, and connected with this arm is a pitman 156. The pitman is connected with an arm 157, the latter being mounted upon a vertical shaft 158, as shown more particularly in Figure 2. This vertical shaft extends through the table 30, and through bearings 159, 160, as shown more particularly in Figures 2 and 6. Connected rigidly with the shaft 158 and located below the table 30 is an arm 161, used for the purpose of rocking the shaft. Connected with the arm 161 is a rod 162, this rod being also connected with a sliding bar 163. A bearing 164, secured upon the under face of the table 30, supports the sliding bar 163. The sliding bar 163 carries a roller 165, and this roller engages a cam 166, secured rigidly upon, and therefore revoluble with, the shaft 56.

Thus whenever the shaft 56 is turned by rotation of the pulley 60, the cam 166 causes the sliding bar 163 to reciprocate in the general direction of its own length, so that through the medium of the rod 162 and the arm 161 a rocking motion is conferred upon the vertical shaft 158.

This motion rocks the arm 157, so that the pitman 156 acts through the arm 155 and causes the shaft 143 to rock. As a result the arm 151 has a rocking movement, and the vacuum plate 152 is thereby caused to swing bodily back and forth.

In consequence of the arrangement just described, the vacuum plate 152 is alternately brought first out over the pile of wrappers 139 and then over some one of the package wrapping platforms, which for the moment happens to be immediately adjacent the wrapper magazine, as may be understood from Figure 2. The pipe 154 has sufficient resilience and flexibility to permit of the movement described for the vacuum plate 152.

It will be noted that, since the shaft 143 has a vertical or thrusting movement as well the rocking movement just described, the vacuum plate 152 must be affected accordingly. That is to say, the vacuum plate moves slightly up and down, as well as rocks back and forth. The various movements just described are caused to take place in such sequence as to produce the following steps—assuming that the parts under discussion occupy the positions indicated for them in Figures 1 and 2, and that the machine is in operation: First, the vacuum plate 152 descends, so that the several mouth-pieces 153 are brought down upon the uppermost one of the wrappers meanwhile, the valve 154$^b$, shown in Figures 6 and 7, is opened; second, the vacuum plate 152 rises, carrying with it the single wrapper which is uppermost; third, the shaft 143 rocks in a contra-clockwise direction according to Figure 2, so that the vacuum plate 152 is brought directly over the nearest package wrapping platform; fourth, the shaft 143 moves vertically downward a slight distance, so that the vacuum plate with its wrapper descends upon the package wrapping platform; fifth, valve 154$^b$ closes; sixth, the shaft 143 ascends, carrying the vacuum plate upward; and seventh and last, the shaft 143 rocks back to its original position so that the various parts now appear as shown in Figures 1 and 2.

*Ejector mechanism for discharging the package.*

Closely associated with the mechanism just described, and driven in part thereby, is the mechanism employed for discharging the finished package; that is, the mechanism for pushing the packages one at a time in succession, off of the respective package wrapping platforms carried by the turntable.

Referring more particularly to Figures 1 and 2 it will be noted that an arm 167 is mounted upon the vertical shaft 158. This arm is secured rigidly upon the shaft, and therefore movable radially upon the axis of the shaft as a center.

The arm 167 is connected with a slide 168, mounted in a slideway 169, in such manner that the slide is caused to reciprocate within the slideway as the shaft 158 is rocked. The slide 168 carries a hook 170, serving the purpose of an ejector hook. Disposed adjacent the slideway 169 is a delivery board 180, so positioned that the ejector hook 170 is movable toward and from the delivery board. The parts just described are so proportioned, located and arranged that the ejector hook 170 makes a stroke to the left according to Figure 2, each time any one of the package wrapping platforms arrives in alinement with the delivery board 180, as indicated in Figure 2. The stroke of the ejector hook 170, as just described, takes place at a moment while the turntable is stationary.

Thus the ejector hook, carried by the movable slide 168, pushes each package of cheese, when its wrapping is completed, on to the delivery board 180.

*Mechanism for finishing the folded package.*

The folding of the wrapper upon the cheese cake necessarily involves a number of steps, more or less distinct, and in my apparatus the various steps may be grouped into two classes; first the folding of the wrapper by means of the folder arm 98, 99, and the folder fingers 130, 131, 132, 133, as above described; and second a further folding, as a means of finishing the package. I will now describe the mechanism used for the purpose last mentioned.

Referring more particularly to Figure 11, it will be noted that the revoluble shaft 71 carries at one of its ends a bevel gear 181. This bevel gear meshes with a bevel gear 182, the latter being secured upon the lower end of a vertical shaft 183. This vertical shaft extends centrally through the stationary shaft 86 of tubular form above described and shown more particularly in Figure 11.

Mounted rigidly upon the upper end of the shaft 183, and thus revoluble therewith, is an endless spiral cam 184, of a type sometimes designated as a worm cam, and having a form which may be understood from Figures 11 and 16. Operatively connected with the cam 184 is a rocking lever 185, actuated by rotation of the cam 184 and supported by a bearing 186. The stationary shaft 86 is provided with a sleeve 86ª, and extending from this sleeve is an arm 187 as shown in Figure 16. The lever 185 carries a roller 188, and this roller engages a stirrup 189. The stirrup is supported upon a pair of sliding rods 190, which are encircled by spiral springs 191, as shown more particularly in Figures 16, 17, 18. The sliding rods 190 extend vertically through bearings 192, and are secured rigidly to a plunger 193, having a form indicated more particularly in Figure 16. The arm 187 is provided with a downwardly projecting portion 194, against the under side of which the plunger 103 may rest, as indicated in Figure 16. The plunger 193 carries a pair of blades 195, disposed parallel with each other and each rigid relatively to the plunger.

As the lever 185 is rocked upon the bearing 186 by means of the cam 184, the roller 188 alternately depresses the stirrup 189 and allows the latter to rise in consequence of the upward pressure of the springs 191. Thus the plunger 193 moves alternately upward and downward, and in each of its movements it is guided accurately by the sliding rods 190. Each of the blades 195 moves accurately up and down, in a vertical path. The parts just described are so located, proportioned and arranged, and so co-related to the turntable and other movable parts, that whenever the blades 195 descend as above described, they partially encompass a package consisting of a cake of cheese and a wrapper partially folded thereupon, as hereinafter more completely described.

Closely associated with the blades 195, and co-acting therewith relative to the package just mentioned, are two other blades 196 and 197. These two blades I designate as the lower blades, to distinguish them from the two blades 195 above described, and which I call the upper blades. The two lower blades 196, 197 are slidably mounted within the frame 95 above described, and are pivotally connected at their respective bottom ends with a rocking yoke 198, the form of which may be understood from Figures 11, 17, 18. For connecting each blade 196, 197, with the rocking yoke 198 I use a pivotal connection 198ª, of a form which may be more particularly understood from Figure 17. The rocking yoke 198 is journaled upon a bearing 199, carrying a pin 200, as shown more particularly in Figures 11, 17, 18. Although the rocking yoke is closely associated with the slide 123, and in fact partially circumscribes the latter, the yoke has no mechanical connection with the slide, and is actuated independently thereof. The yoke 198 carries a shoe 201, which rests upon the upper end of a sliding bar 202. The sliding bar 202 extends vertically through a bearing 203, as may be understood from Figures 11 and 17, and projects below the table 30, through which it extends, as may be seen from Figure 11.

The sliding bar 202 carries at its lower end a roller 204, which engages a cam 205. This cam is mounted rigidly upon a revoluble shaft 206, this shaft being mounted in hangers 207, 208. In order to strengthen the cam 205, I provide it with a hub 209, which is integral with it and tightly encircles the shaft 206. In order to turn the shaft 206 I provide it with a bevel gear 210, which meshes with the bevel gear 182 above described, as indicated in Figure 11. The shaft 206 carries the cam 154$^f$, above described as used in connection with the valve 154$^b$. As may be understood from the foregoing description, rotation of the shaft 71 causes the gear wheel 181 to turn the gear wheel 182, and this gear wheel drives the gear wheel 210, conferring a rotary motion upon the shaft 206 and thus causes the cam 205 to actuate the sliding bar 202. The sliding bar causes the lower blades 196, 197 to reciprocate vertically in sequence with the vertical movements of the upper blades 195, as hereinafter more completely described.

*Pneumatic holdfast for wrapper.*

It is desirable that each wrapper, as it rests upon some one of the package wrapping platforms, be held firmly in position while the cheese cake is being deposited upon the wrapper and while some, at least, of the steps of folding the wrapper around the cheese cake are being taken. For the purpose first stated I provide pneumatic mechanism which as a whole performs the office of a holdfast for the wrappers. I will next describe this part of my invention.

Mounted rigidly upon the stationary shaft 86 of tubular form is an annulus 211, provided with a groove 212 of substantially C-form, as indicated in Figure 14. A pipe 213 is connected with the annulus 211, and is at all times in open communication with the groove 212, as indicated in Figure 11. The pipe 213 is also connected with an air pump (not shown), and like the other pipe 154 above described, contains air at less than atmosphere pressure; or in other words, these are so-called vacuum pipes.

Encircling the annulus 211, and making a fit thereto which is nearly but not quite air tight, is a closure ring 214, supported upon pins 215 as indicated in Figure 11, and thus revoluble with the turntable. The annulus being stationary, and the closure ring being revoluble, these two parts constitute a pneumatic coupling, by aid of which a partial vacuum is constantly maintained in the groove 212.

The closure ring 214 is provided with radially disposed holes 214$^a$, and fitted into these holes are threaded unions 217, in this particular instance six in number; and connected with these unions are an equal number of pipes 216, each of the general J-form, as indicated in Figures 2 and 14. Each pipe 216 is at its outer end provided with a portion 218 of reduced diameter, connected with a bed 219. Each of the package wrapping platforms carries one of these beds, the form of which may be understood from Figure 18. Each bed 219 is provided with a facing 220, the facing having holes 221 extending through it. These holes communicate with a compartment 222, with which the bed 219 is provided. Each pipe 216 is always in communication with one of the compartments 222 with which it is associated, as may be understod from Figure 18.

Each pipe 216, as it is carried bodily by the turntable, is alternately brought into and out of communication with the groove 212. Thus assuming that the holes 221, in the face plate 220, are closed by a wrapper resting upon the face plate, it follows that each time any pipe 216 is brought into communication with the groove, a partial vacuum is formed in the pipe and consequently in the compartment 222 with which the pipe is associated; and each time the pipe is out of communication with the groove (see Figure 14), the partial vacuum in the pipe and in the compartment 222 is destroyed. This is because, after communication between the pipe 216 and the groove is cut off, as shown at the left of Figure 14, an infiltration of air takes place between the closure ring 214 and the adjacent portion of the annulus 211, thus venting the pipe 216 and letting air freely into the compartment with which it is associated.

The mechanism just described is essentially a pneumatic holdfast for securing the wrapper in position upon the package wrapping platform, and for releasing the wrapper at the proper moment.

In order to make a distinction between the pile of wrappers 139 and an individual wrapper after its removal from the pile, I designate the individual wrapper as 223.

A single cake of cheese is indicated by the numeral 224.

For convenience in designating the several successive positions, occupied from moment to moment by any particular package wrapping platform as the turntable carrying it turns step by step, I have in Figure 2 designated the respective positions as A, B, C, D, E and F. The first step of work done by or upon any particular package wrapping platform takes place when the platform is in the position indicated by A, and the last step takes place when the platform is in the position indicated F.

The several successive positions assumed by each package wrapping platform, incidental to the step-by-step movement of the turntable, and indicated by the letters A, B, D, E and F, are closely associated with the successive diagrams shown in Figures 22 to 31 inclusive. That is to say, Figure 30 indicates the condition of any particular package wrapping platform, and various movable parts associated therewith, when the platform stops in the position indicated for it at A. Figure 23 indicates the condition of the same platform when it stops in the position indicated at B. Figure 24 indicates the condition of the platform and the positions assumed by various movable parts carried by it, while the platform is in motion traveling from the position B to the position C. Figure 25 indicates the condition of the platform and parts associated with it when the platform stops in the position C. As the platform is traveling from this position to the position D various movable parts carried by the platform execute movements indicated by full and dotted lines in Figure 26. When the platform stops in the position D, however, all movable parts carried by it are at rest in the positions indicated for them in Figure 23. When the platform moves into the position E and stops, certain movable parts carried by the platform are caused to execute certain movements in sequence with movements of other parts not carried by the platform, as indicated in the two Figures 24 and 29. While the platform is in motion traveling from the position E to the position F, certain movable parts carried by the platform are actuated, as indicated in Figure 30. When the platform stops in the position F as shown in Figure 9, the movable parts carried by the platform are stationary, but other parts mounted independently of the platform but co-acting therewith are actuated.

This is set forth more particularly below, in connection with the general operation of my device.

*General operation.*

Assuming that the various parts are assembled and arranged; that by appropriate means a partial vacuum is created and maintained in each of the air pipes; that power is being applied to the power shafts by means of the pulleys used for the purpose; and that a supply of cheese has been provided, along with a supply of wrappers, all as above described—I will now set forth the operation of my device.

For this purpose, I call attention particularly to the diagrams shown respectively in Figures 22 to 31 inclusive in connection with the several successive positions and the varying conditions for any one of the package wrapping platforms, as indicated in Figure 2 by the letters A to F, inclusive.

In the diagram Figure 22, showing a package wrapping platform occupying the position indicated in Figure 2 as A, the status of various parts is as follows: The folder arms 98 and 99 are down in their lowermost positions; the folder fingers 130, 131, 132 and 133 are also down in their lowermost positions; the lower blades 196, 197 are likewise down at the limit of their travel; and air is being drawn downwardly through the holes 221.

With the various parts just mentioned occupying the positions indicated for them and being stationary, a single wrapper 223 is carried from the wrapper magazine and laid upon the package wrapping platform, as above described under the heading wrapper magazine and its accessories. Summarized in detail, this action is as follows: The vertical shaft 143 (see Figures 1 and 2) under action of the cam 150 and parts immediately associated therewith, makes a quick descent and rises quickly to its original position. Hence the vacuum plate 152, now directly over the pile of wrappers 139, is brought down upon the top of the pile, and then quickly raised. The vacuum plate 152, into which air is now passing through the mouthpieces 153, thus picks up and carries upward with it a single wrapper 223. Next the vertical shaft 143, carrying the arm 151 and the vacuum plate, is by means of the mechanism shown in Figure 9 and in the lower left hand portion of Figure 6 caused to rock, so that the vacuum plate is shifted horizontally and thus brought directly over the nearest package wrapping platform. This done, the vertical shaft 143 again makes a quick descent and again rises, thus depositing the wrapper 223 upon the platform and leaving it there. At the instant when the wrapper is thus deposited, the partial vacuum in the vacuum plate is destroyed, because the flow of air into the vacuum plate is stopped by action of the valve 154$^b$, shown in Figure 7 and in the upper portion of Figure 6, so that the wrapper 223 is released from the vacuum plate, and now rests upon the package wrapping platform. Finally the vertical shaft 143 again rocks, but in the reverse direction to that in which it rocked before, so that the vacuum plate 152 is restored to its initial position, indicated in Figure 2. At the same time the valve 154$^b$, shown in Figure 7 and in the upper portion of Figure 6, is again actuated so as to permit air to flow through the air pipe 154$^a$, and thus air is again drawn through the mouthpieces 153, carried by the vacuum plate. Hence the vacuum plate and the parts immediately associated therewith now occupy the positions and conditions originally assumed for them.

The wrapper 223, now resting upon the package wrapping platform, is held there firmly by means of the pneumatic mechanism above described under the heading pneumatic holdfast for wrapper. This pneumatic mechanism is entirely distinct from, and independent of, the pneumatic mechanism of which the vacuum plate 152 is a part. In other words each wrapper is picked up and laid upon a package wrapping platform, by aid of one pneumatic mechanism, and is then held firmly upon the platform, and later released therefrom, by a different pneumatic mechanism.

The diagram Figure 23 shows a package wrapping platform as occupying the position designated in Figure 2 as B, and as carrying a wrapper 223. The wrapper is now directly underneath the slide 45; and a cake of cheese 224 has just been disposed upon it. The various movable parts carried by the package wrapping platform remain in the same positions, relatively to each other and to the platform, that they assumed as just described with reference to the position designated as A, and the wrapper is still held firmly in position by virtue of the pneumatic apparatus above described under the heading pneumatic holdfast for wrapper.

The next step-by-step movement of the turntable carries the platform to the position designated upon Figure 2 as C, and as shown more particularly in the diagram Figure 25.

While the platform is moving from the position B into the position C, and thus while the turntable is in motion, the folder arm 98, that is, the one carried by the front of the platform reckoning from the direction of its travel, as indicated in Figure 24 by the arrow swings upwardly, so as to bend the adjacent portion of the wrapper 223 upwardly and over the cheese cake 224. A moment later, but while the platform is making the same traveling movement from the position B to the position C, the folder arm 99, that is, the folder arm carried by the rear of the platform reckoning from the direction of its travel, also swings upwardly, and in so doing bends the adjacent portion of the wrapper upwardly and over the cheese cake. Thus the folder arms 98, 99 are brought into the positions indicated for them in Figure 25. This leaves the cheese cake in such condition that it is covered by the wrapper except at the ends of the cake, which are still exposed.

Next the package wrapping platform moves from the position C to the position D, indicated by the diagram Figure 27. During this movement, with the folder arms 98, 99 still occupying the positions just described for them, the folder fingers, four in number, moving simultaneously and as a gang, swing up end engage the wrapper, bending it inwardly from two directons at each end of the cake, as may be understood from Figure 26. Then, before the completion of the same movement in the travel of the package wrapping platform, the four folder fingers, moving simultaneously and as a gang, drop back into their respective original positions. These movements of the folder fingers are indicated by full and broken lines in Figures 26, the movement of the platform being indicated by the arrow.

The portions of the wrapper thus bent inwardly by the folder fingers are brought into contact with the ends of the cheese cake, to which they adhere in consequence of the adhesiveness of the cheese:

When the platform stops in the position indicated in Figure 2 as D, and shown in Figure 27, all of the parts immediately associated with the cheese cake or the wrapper remain at rest. Hence the position D, here contemplated, is a so-called idle position.

The next step-by-step movement of the turntable carries the platform into the position indicated in the two Figures 28 and 29, and designated in Figure 2 as E. The following operations now take place: First, the two upper blades 195, initially in their uppermost or normal positions, move directly downward with a gentle but rapid thrusting movement, and in so doing they engage the two upper protruding portions of the wrapper, and fold them downwardly, flat and tight against the adjacent ends of the cheese cake, the latter being still somewhat sticky as above described. The two portions of the wrapper thus immediately affected are thereby forced into good engagement with the ends of the cheese cake, and caused to adhere thereto. The upper blades continue their descent until their bottom edges are nearly flush with the lower face of the cheese cake: but each blade in executing this movement extends in between one end of the cheese cake and the adjacent protruding portion of the wrapper. Second, the two upper blades 195 return to their uppermost or normal positions, and as they rise the two lower blades also rise, the rate of speed of all four of the blades being substantially the same. Thus each of the upper blades 195, as it rises is maintained substantially equidistant from the lower blade 196 or 197 with which it is immediately associated. Since the two lower blades are beneath the lower protruding portions of the wrapper, and the two upper blades are now in between the said protruding portions and the adjacent end portions of the cheese cake, it follows that each of these protruding portions is by the upward thrust of the lower blade engaging it forced upwardly so as to follow the adjacent upper blade as the latter is withdrawn, and is thus folded flatly and tightly against the adjacent portion of the wrapper, the last-mentioned portion of the wrapper being already folded and pressed tightly against the adjacent end of the cheese cake. Third, when the lower blades reach such position that their upper edges are nearly flush with the upper face of the cheese cake, they stop rising and then descend into their lowermost or normal positions. This leaves the package completely wrapped, but with the two folder arms 98, 99 embracing it.

The various devices whereby the upper and lower blades are actuated are above described under the holding mechanism for finishing the folded package.

The next step-by-step movement of the turntable carries the platform into position indicated by the diagram Figure 31, and designated in Figure 2 as F.

While the platform is traveling from the position E to the position F according to Figure 2, as shown by the diagram Figure 30 in which the direction of travel is indicated by the arrow, certain operations take place. First, the folder arm 98, which is the one in advance reckoning from the direction of travel, swings downwardly and into its lowermost position; next the folder arm 99, which is to the rear according to the direction of travel, likewise swings downwardly and into its lowermost position; and lastly, the package, now completed, is released from the suction grip of the pneumatic holdfast—or in other words the partial vacuum in the particular pipe 216 is destroyed, because communication between the pipe in question and the groove 212 is now cut off, as may be understood from Figure 14. The manner in which the folder arms 98 and 99 are swung downwardly is above described under the heading package wrapping platforms; and the structure and operation of the pneumatic mechanism here contemplated are above set forth under the heading pneumatic holdfast for wrapper.

After the platform stops in the position shown in Figure 31 and indicated as F in Figure 2 the parts appear as indicated in the diagram, Figure 31. The package, now finished and in every way free, merely resting by its own weight upon the platform, is next pulled off of the platform and on to the delivery board 180 by a stroke of the ejector hook 170, after which the ejector hook assumes its initial or normal position, as indicated in Figure 2. The mechanism for actuating the ejector hook and parts immediately associated therewith is above described under the heading ejector mechanism for discharging the package.

After the package is thus landed upon the delivery board, it is in due course with others of its kind removed therefrom and sold or shipped, or otherwise disposed of in any appropriate manner.

My machine is made up of parts which are for the most part readily accessible, simple in construction and easily standardized.

I do not limit myself to the particular mechanism shown and described, as variations therefrom may be made without departing from my invention, the scope of which is commensurate with my claims.

Having thus described my invention, what I claim as new and desire to secure by Letters Patent is as follows:

1. A device of the character described, comprising a turntable, means for turning the same step by step, a package wrapping platform mounted upon said turntable and revoluble therewith, folder mechanism carried by said turntable and disposed adjacent said package wrapping platform, a pneumatic holdfast carried by said turntable and connected with said package wrapping platform, for temporarily securing a wrapper upon said package wrapping platform, and a pipe connected with said pneumatic holdfast and extending away from said turntable, for maintaining a partial vacuum in said pneumatic holdfast.

2. A device of the character described, comprising a turntable, means for actuating said turntable, a package wrapping platform mounted upon said turntable, a bed carried by said package wrapping platform and provided with a perforated facing, means for producing a partial vacuum between said bed and said facing for the purpose of holding a wrapper upon said facing, and folder mechanism associated with said package wrapping platform for the purpose of folding said wrapper while said wrapper is thus held upon said facing.

3. A device of the character described, comprising a framework, a column secured rigidly to said framework, a hollow annulus mounted upon said column, a closure ring engaging said annulus and forming therewith a pneumatic coupling, a pipe connected with said annulus to facilitate the maintenance of a partial vacuum therein, a turntable revolubly mounted upon said column, connections from said turntable to said closure ring for the purpose of enabling said closure ring to turn with said turntable, means for actuating said turntable step by step, a package wrapping platform carried by said turntable and provided with a pneumatic holdfast for temporarily securing a wrapper upon said package wrapping platform, and a pipe connected with said pneumatic holdfast and extending therefrom to said closure ring, said pipe communicating with the space within said closure ring.

4. A device of the character described comprising a frame, a column secured thereto and extending therefrom, a turntable journaled upon said column and revoluble relatively thereto, means for actuating said turntable step by step, a package wrapping platform carried by said turntable, a pneumatic holdfast carried by said turntable for temporarily holding a wrapper upon said package wrapping platform, a pipe connected with said pneumatic holdfast for maintaining a partial vacuum therein, said pipe being carried by said turntable, and a coupling connecting with said pipe and with said column upon which the turntable is journaled, for the purpose of maintaining a partial vacuum in said pipe.

5. A device of the character described comprising a frame, a turntable mounted upon said frame, means for turning said turntable step by step, a pneumatic holdfast carried by said turntable for the purpose of temporarily holding a wrapper, folding mechanism carried by said turntable for the purpose of folding said wrapper around a cake of plastic material, a pneumatic coupling connected with pneumatic holdfast, and a stationary pipe connected with said pneumatic holdfast and with said coupling in order to facilitate the maintenance of a partial vacuum within said pneumatic holdfast.

6. A device of the character described comprising a frame, a column mounted rigidly upon said frame, a turntable journaled upon said column, a pneumatic holdfast carried by said turntable for the purpose of holding a wrapper in order to facilitate the application of the wrapper to a cake of plastic material resting thereupon, an annulus mounted rigidly upon said column and thus rendered stationary, a closure ring engaging said annulus and forming therewith a pneumatic coupling, a pipe connected with said annulus for the purpose of producing a partial vacuum therein, and a pipe connected with said closure ring and communicating with said partial vacuum in said annulus, said last mentioned pipe being carried by said turntable and being connected to said pneumatic holdfast.

7. In a device of the character described the combination of a frame, a turntable supported by said frame and journaled to turn relatively thereto, a cam ring supported by said frame and located below said turn-table, said cam ring being provided with a cam wall extending towards said turntable, a frame carried by said turntable and extending vertically through the same, a sliding rod mounted within said frame and extending through said turntable, a roller carried by said sliding rod and located below said turntable so as to engage said cam wall, a rack carried by said sliding rod, a pinion engaging said rack, a shaft journaled upon said turntable and carrying said pinion so as to be rocked back and forth, and a folder arm connected with said shaft and actuated thereby for the purpose of bending a wrapper supported by said turntable.

8. A device of the character described comprising a frame, a turntable supported by said frame and revoluble relatively thereto, means for turning said turntable step by step, a cam ring disposed adjacent said turntable and provided with a wall of annular form, a pair of sliding bars carried by said turntable, connections from said sliding bars to said cam wall for enabling said sliding bars each to be thrust in the direction of its length relatively to said turntable, folder arms carried by said turntable for bending a wrapper about an article to be wrapped, connections from said folder arms to said sliding bars for enabling said folder arms to be actuated by the thrusting movements of said sliding bars, folder fingers carried by said turntable for further manipulating said wrapper, and mechanism connected with said folder fingers and controllable by revoluble movements of said turntable, for the purpose of actuating said folder fingers.

9. A device of the character described comprising a frame, a turntable supported by said frame, means for actuating said turntable step by step, a package wrapping platform carried by said turntable, a holdfast carried by said turntable and disposed substantially in the middle of said package wrapping platform for selectively securing the middle portion of a wrapper upon said package wrapping platform, a pair of folder arms carried by said turntable and located upon opposite sides of said holdfast, and mechanism connected with said folder arms and controllable by movements of said turntable, for actuating said folder arms.

10. A device of the character described comprising a frame, a turntable mounted thereupon, a package wrapping platform carried by said turntable, a holdfast carried by said turntable and located in the proximate middle of said package wrapping platform for selectively holding the middle portion of a wrapper, a pair of folder arms mounted upon opposite sides of said package wrapping platform and adapted to rock in opposite directions in order to bend the oppositely disposed edges of said wrapper over an article to be wrapped, mechanism connected with said folder arms and controllable by movements of said turntable for actuating said folder arms, a plurality of folder fingers carried by said turntable and coacting with said folder arms for further folding said wrapper, and mechanism connected with said folder arms and controllable by movements of said turntable for actuating said folder arms.

LEWIS B. HUNTER.